(No Model.)
J. M. SAUSSER.
PORTABLE WATER TANK.
No. 445,413. Patented Jan. 27, 1891.
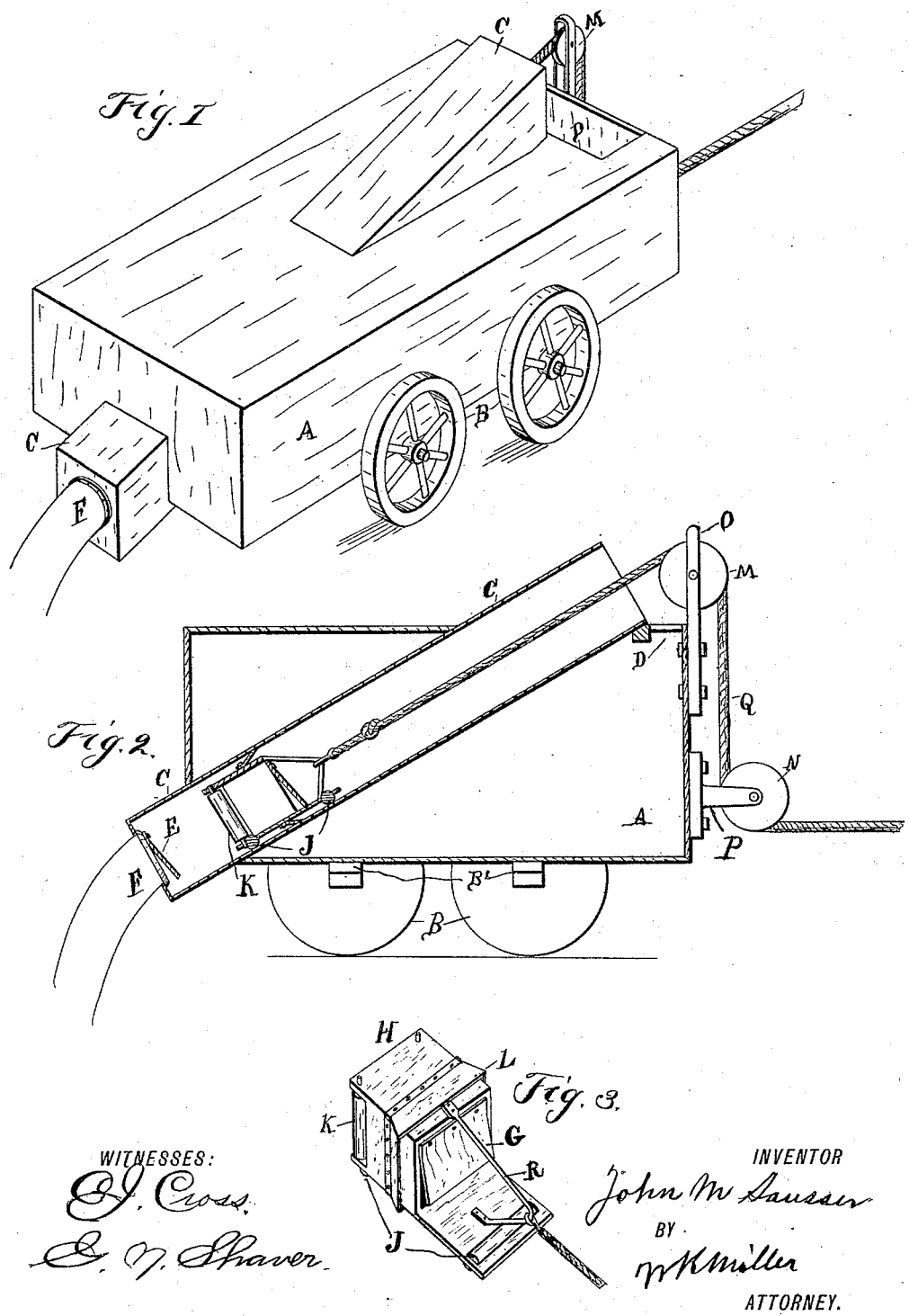
WITNESSES:
O. J. Cross.
E. N. Shaver.
INVENTOR
John M. Sausser
BY
W. K. Miller
ATTORNEY.

UNITED STATES PATENT OFFICE.

JOHN M. SAUSSER, OF OSNABURG, OHIO.

PORTABLE WATER-TANK.

SPECIFICATION forming part of Letters Patent No. 445,413, dated January 27, 1891.
Application filed September 1, 1890. Serial No. 363,628. (No model.)

*To all whom it may concern:*

Be it known that I, JOHN M. SAUSSER, a citizen of the United States, and a resident of Osnaburg, county of Stark, State of Ohio, have invented a new and useful Improvement in Portable Water-Tanks, of which the following is a full, clear, and exact description, reference being had to the accompanying drawings, making part of this specification.

My invention relates to an improvement in portable water-tanks to remove water from mines to supply portable engines and for irrigation purposes; and it consists in providing a lifting-pump to be operated by animal or other power to raise water from a sump in mines to the tank, by which it is transported out of the mine to a place of discharge, or from rivers or pools to portable engines or lands to be irrigated.

With these ends in view my invention consists in certain features of construction and combination of parts, as will be hereinafter described, and pointed out in the claims.

Figure 1 of the accompanying drawings is a view in perspective of a water-tank and pump illustrating my invention; Fig. 2, a sectional view, and Fig. 3 a perspective, of the piston and valve.

Similar letters of reference indicate corresponding parts in all the figures of the drawings.

For the purpose of this case I have shown my invention as applied to remove water from a mine, the carrying-wheels B to be adapted to some form of tramway.

The tank A may be constructed of any suitable material. In this case I have shown the tank in quadrilateral form; but, if preferred, the tank may be cylindrical, said tank to rest horizontally on the axles B', forming the truck; but when used on highways to carry water to supply portable or agricultural steam-engines the truck would of necessity be constructed similar to the ordinary road-wagon. The pump-barrel C is square in cross-section, as shown, and is placed diagonally across the tank A from the lower rear portion to the upper front portion, at which point is provided an aperture D, through which the water may flow from the upper end of the pump into the tank. At the bottom of the pump-barrel is provided a check-valve E and a flexible pipe or hose portion F.

The lift-valve G is constructed substantially as shown, and is supported on the carrying frame or box H, the two thus forming a valved piston. Said frame has on its under side rollers J, that extend across said frame and rest and roll on the bottom wall of the pump-barrel to carry the valve G, and at the lower end portion of the piston are provided rollers K, that roll against the side walls of the pump-barrel, the object of which is to reduce friction and to save the packing-lips L from destructive wear, as would be the case with so large a valve. To appreciate the fact it must be understood that in practice the piston is to raise from thirty to forty gallons of water at each stroke. To raise the piston and its load, grooved rollers, as M and N, are provided, the former supported in a standard O, secured to the upper front portion of the tank, the latter supported in a forwardly-projected bracket P, secured to the lower front portion of the tank. A rope Q is placed about the roller, as shown in the drawings, one end of which is secured to the bail R of the valve-frame and to the other end the power is applied to raise the water.

In practice, for removing water from a mine the tank is loaded on an ordinary truck, the wheels of which are adapted to travel on such tramway as may be provided, the tank is drawn into the mine, usually by a mule, the hose F is placed in a sump in which the water has been gathered, the animal used to draw the tank is hitched to the rope, and the piston drawn up with its load, which is allowed to flow into the tank through the aperture D, usually raising a barrel at a time, the animal is turned to slack the rope to allow the piston to slide down the pump, and the operation repeated. Thus a mine-tank to hold twenty barrels may be filled inside of ten minutes, while with the ordinary hand pump or bucket one hour or more time would be required to fill the tank. This same advantage will hold good in filling tanks from pools or streams for supplying water to engine-boilers or for irrigation, thus saving a vast amount of labor and expense.

Having thus fully described the nature and object of my invention, what I claim as new, and desire to secure by Letters Patent, is—

1. The combination of a portable water-tank, a pump-barrel C, secured in a diagonal relation therein, a piston H to move in said barrel, having rollers J and K to carry said piston free from the bottom and sides of the barrel, packing-lips L to engage the sides of the barrel, the valve G, and bail R, substantially as described, and for the purpose set forth.

2. The combination of a portable tank, a pump-barrel C, secured in diagonal relation thereto, a piston H, having rollers to carry said piston apart from the bottom and sides of said barrel, packing-lips L about said piston, valve G, and bail R, the rollers M and N, and rope Q, substantially as described, and for the purpose set forth.

In testimony whereof I have hereunto set my hand this 20th day of August, A. D. 1890.

JOHN M. SAUSSER.

Witnesses:
W. K. MILLER,
ATLEE POMERENE.